June 14, 1938.  E. H. SCHULZE  2,120,578
SPEEDOMETER DRIVE FOR BICYCLES
Filed March 22, 1937
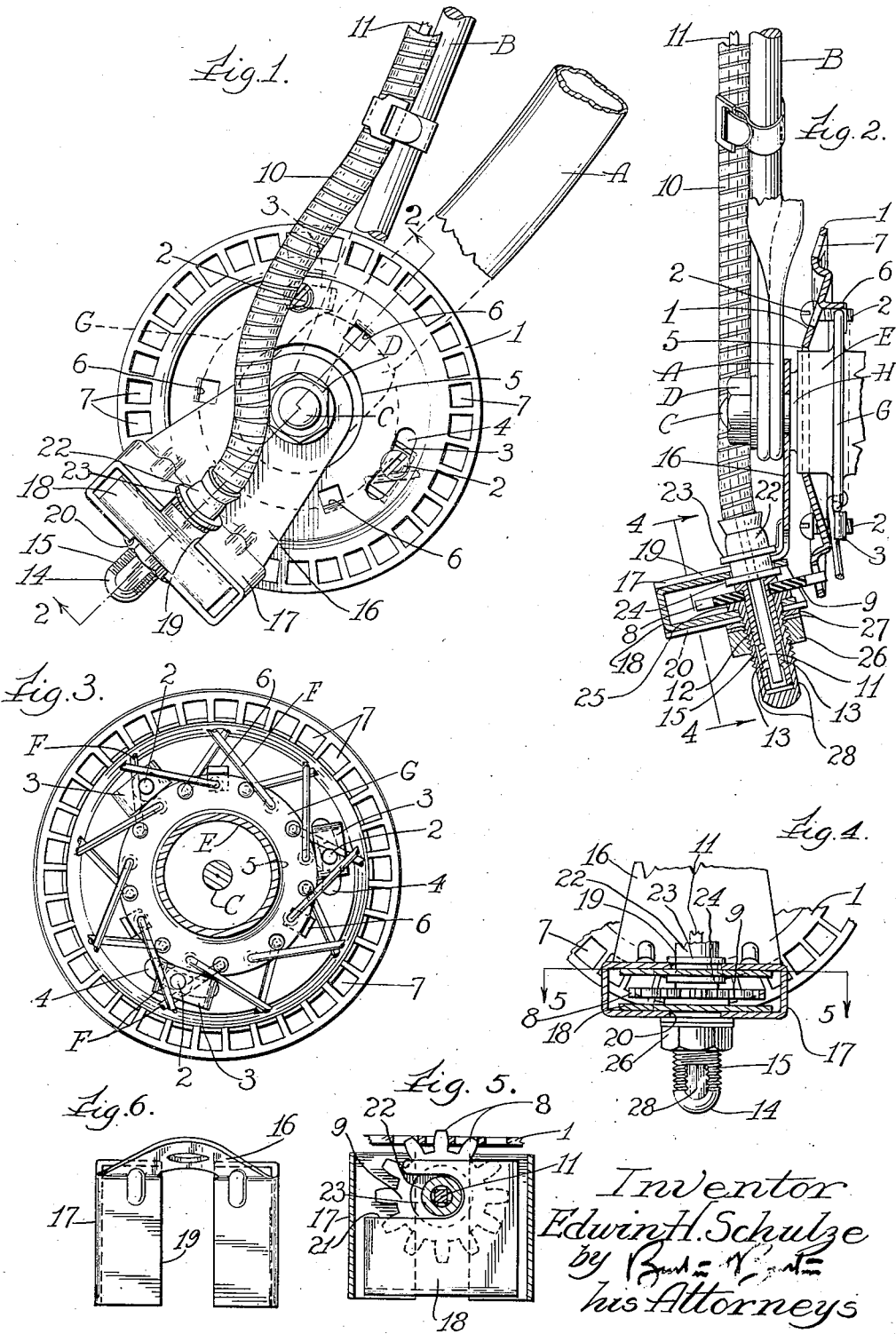
Inventor
Edwin H. Schulze
by
his Attorneys Patented June 14, 1938

2,120,578

UNITED STATES PATENT OFFICE 2,120,578

SPEEDOMETER DRIVE FOR BICYCLES

Edwin H. Schulze, Chicago, Ill., assignor to Stewart-Warner Corporation, Chicago, Ill., a corporation of Virginia Application March 22, 1937, Serial No. 132,265

12 Claims. (Cl. 74—12)

This invention relates to drive mechanism for speedometers, and particularly to structure for supporting such mechanism on a bicycle frame. One object of the invention is to facilitate the mounting and adjustment of the parts in the best operative relation. Another object of the invention is to afford a simple and economical form of bearing for the flexible shaft and its pinion through which motion is transmitted to the speedometer. Another object is to provide means for accurately centering the driving gear about the hub of a bicycle wheel. The invention consists in certain features and elements of construction in combination, as herein shown and described and as indicated by the claims.

In the drawing:

Figure 1 is a side elevation showing fragments of a bicycle frame together with a speedometer drive gear and the associated bracket which carries the driven pinion and the lower end of the flexible shaft.

Figure 2 is a rear elevation of the structure shown in Figure 1 with parts in section, as indicated at line 2—2 on Figure 1.

Figure 3 is a side elevation of the driving gear showing the inner face of the gear as mounted against the bicycle wheel, together with a portion of the hub and fragments of the spokes of the wheel adjacent the gear.

Figure 4 is a detail section taken as indicated at line 4—4 on Figure 2.

Figure 5 is a detail section taken as indicated at line 5—5 on Figure 4.

Figure 6 is a detail plan view of the mounting bracket member with associated parts removed therefrom.

A speedometer used on a bicycle is preferably driven by a geared connection with one of the wheels, and it is usually more convenient to make this connection to the front wheel of the bicycle. Thus it may be understood that in Figure 1 a fragment of the front fork is shown at A, together with an adjacent fragment of the fork truss rod, B, and that the front wheel axle is seen at C with a clamping nut, D, by which it is normally secured in the fork. Figure 2 shows the end portion of the wheel hub, E, and Figure 3 shows a number of the usual wire spokes, F, extending from the flange, G, of the hub, E. For driving the speedometer a gear wheel, 1, which may be formed of sheet metal, is attached to the wheel concentrically with its hub, E, by means of bolts, 2, extending through the web of the gear wheel, 1, and engaging specially formed nuts or clips, 3, each of which overlaps the inner end portion of one of the spokes, F, as seen in Figure 3, so that the gear wheel, 1, is as firmly clamped in position. As shown, the gear is provided with three of these securing bolts, 2, one of which extends through an ordinary round aperture in the web of the gear wheel, while slots, 4, are provided for the other two bolts so that they may be shifted, as required, to secure proper engagement of their clips, 3, with the spokes.

If, as seen in Figure 2, the central opening, 5, in the gear, 1, fits closely over the end of the hub, E, this will serve to centralize the gear, but, in addition, the web of the gear, 1, is formed with three inwardly projecting lugs, 6, adapted to fit over the flange, G, of the hub, and also tending to afford a positive driving engagement between the gear wheel, 1, and the spokes of the bicycle wheel. It will be understood that the gear may be of any suitable form; as shown, it is made with a series of approximately square apertures, 7, adjacent its periphery for meshing with the teeth, 8, of the pinion, 9, which drives the flexible shaft leading to the speedometer, not shown.

As usual, the flexible shaft is housed in a flexible tubular casing, 10, and is formed with a squared terminal, 11. The pinion, 9, is permanently and rigidly secured to a hollow shaft or tube, 12, which is deformed at 13 to provide driving engagement with the squared end of the shaft, 11, as seen in Figure 2. The hollow shaft, 12, is journaled in a sleeve or hollow stud, 14, which is externally threaded at 15 for a purpose about to be explained.

To support the driven pinion, 9, and the lower end of the flexible shaft in proper relation to the driving gear, 1, a bracket, 16, is hung on the axle, C, and clamped in position by tightening of the nut, D, with the flat arm of the bracket, 16, secured, as shown in Figure 2, between the fork, A, and the bearing cone, H, for the wheel hub, E. The bracket includes a laterally extending guideway, 17, in which there is slidably carried a yoke, 18. The upper and lower walls of the guideway, 17, are formed with slots, 19 and 20, extending in a direction toward and from the plane of the bicycle wheel and that of the gear, 1, and the upper and lower arms of the yoke, 18, include transversely extending slots, 21. The terminal ferrule, 22, of the flexible shaft casing, 10, includes flanges, 23 and 24, which are disposed respectively above and below the upper walls of the guideway, 17, and the yoke, 18, therein, and the intermediate portion of this terminal, 22, extends through the guide slot, 19, and the transverse slot, 21, of the yoke, 18. Thus, by sliding the yoke, 18, in the guideway, 17, the flexible shaft may be moved toward and from the plane of the gear, 1.

The bearing stud, 14, terminates in a flange, 25, which, as seen in Figure 2, is lodged inside the yoke, 18, with the body of the stud, 14, extending through the lower slot, 21, of the yoke and through the slot, 20, of the guideway, 17. A clamping nut, 26, with interposed washers, 27, one of which may be a lock washer, if desired, is screwed onto the threads, 15, of the stud, 14, and bears against the under side of the bracket guideway, 17. Thus the stud, 14, and the terminal, 22, of the flexible shaft, are both carried by the yoke, 18, in its slots, 21, in which they are respectively engaged so that adjustment of the yoke in the guideway, 17, will serve to shift the gear pinion, 9, toward and from the plane of the gear, 1, to secure proper meshing of the teeth of the pinion with the gear. When the parts are thus properly positioned the nut, 26, on the stud, 14, will be tightened to clamp the yoke, 18, at adjusted position in the guideway, 17. For convenience, the lower end portions of the stud, 14, are flattened at 28 so that the stud may be held against rotation while the nut, 26, is being tightened. Thus, the bracket provides for proper mounting of the pinion in relation to its driving gear, and adapts the outfit for use in connection with bicycle wheels of various designs, and also permits the substitution of different sizes of pinions, 9, to ensure the proper gear ratio corresponding to the size of the bicycle wheel in each instance. And the employment of the clamping stud, 14, as a journal bearing for the lower end of the shaft,—the shaft being engaged in the hollow shaft, 12, of the pinion, 9,—keeps the structure relatively simple and reduces the necessary parts to the minimum.

While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

I claim:

1. In combination, a bracket including an arm having an opening to fit the axle of a bicycle wheel adjacent the wheel-supporting fork for securement by the axle nut, said bracket being formed to provide a guideway trending toward and from the plane of the wheel, a bearing yoke movable in said guideway, a flexible shaft, a gear pinion on said shaft disposed in said yoke, bearing means for the shaft carried by the yoke, and means for adjustably securing said yoke in the guideway.

2. In combination, a bracket including an arm adapted for attachment in rigid relation to a bicycle frame and adjacent a wheel of the bicycle, said bracket being formed to provide a guideway trending toward and from the plane of the wheel, a bearing yoke movable in said guideway, the guideway having slots extending in the direction of movement of the yoke, a flexible shaft and a casing therefor having a terminal engaged in one of said slots and in the yoke, a gear pinion on said shaft disposed in the yoke, and a hollow stud engaged in the other slot of the guideway and in the yoke and providing a bearing for the shaft beyond the pinion whereby said shaft casing and said bearing stud are adjustable together when the yoke is shifted in the guideway.

3. In combination, a bracket including an arm adapted for attachment in rigid relation to a bicycle frame adjacent a wheel of the bicycle, said bracket being formed to provide a guideway including upper and lower walls, said walls having parallel slots trending toward and from the plane of the wheel, a flexible shaft and a casing therefor having a terminal engaged in the upper slot, a gear pinion on said shaft disposed between the upper and lower walls of the guideway, and a bearing member for the shaft engaged in the lower slot, said shaft and bearing being adjustable together in the guideway for shifting the gear pinion toward or from said wheel.

4. In combination, a bracket including an arm adapted for attachment in rigid relation to a bicycle frame and adjacent a wheel of the bicycle, said bracket being formed to provide a guideway including upper and lower walls in parallel planes trending toward and from the plane of the wheel, a bearing yoke including upper and lower walls spaced to fit between said walls of the guideway, said guideway having a slot trending toward and from the plane of the wheel, and said yoke having a transversely extending slot in its wall adjacent the slotted wall of the guideway, a flexible shaft and a casing therefor having a terminal with spaced flanges between which the said slotted walls of the guideway and yoke are engaged, with said terminal extending through the overlapping slots of said parts, and a gear pinion on said shaft disposed in the yoke for adjustment toward and from the plane of the wheel by adjustment of the yoke in the guideway.

5. In combination, a bracket including an arm adapted for attachment in rigid relation to a bicycle frame and adjacent a wheel of the bicycle, said bracket being formed to provide a guideway including upper and lower walls in parallel planes trending toward and from the plane of the wheel, a bearing yoke including upper and lower walls spaced to fit between said walls of the guideway, said guideway walls having parallel slots trending toward and from the plane of the wheel, and said yoke having slots in its upper and lower walls respectively, extending transversely of the slots in the guideway, a flexible shaft and a casing therefor having a terminal with spaced flanges between which the adjacent upper walls of the guideway and yoke are engaged, with said terminal extending through the overlapping slots of said parts, and a gear pinion on said shaft disposed in the yoke for adjustment toward and from the plane of the wheel by adjustment of the yoke in the guideway, together with bearing means for the shaft below said gear extending through the adjacent slots of the yoke and guideway and provided with a flange engaging above the lower wall of the yoke, and a clamping member associated with said bearing means engageable against the under side of the lower wall of the guideway.

6. In combination, a bracket including an arm adapted for attachment in rigid relation to a bicycle frame and adjacent the wheel of a bicycle, said bracket being formed to provide a guideway including upper and lower walls in parallel planes trending toward and from the plane of the wheel, a bearing yoke including upper and lower walls spaced to fit between said walls of the guideway, said guideway walls having parallel slots trending toward and from the plane of the wheel, and said yoke having slots in its upper and lower walls respectively, extending transversely of the slots in the guideway, a flexible shaft and a casing therefor having a terminal extending through the overlapping slots in the upper walls of said parts, a gear pinion on said shaft disposed in the yoke for adjustment toward and from the plane of the wheel by movement of the yoke in the guideway, together with a bearing sleeve for the shaft extending through the adjacent slots of the yoke and guideway in their lower walls, said shaft terminal and said bearing sleeve having means forming shoulders abutting the slotted walls through which they extend, one of said shoulders being adjustable for clamping engagement with the parts to hold the gear in adjusted relation in the guideway.

7. In combination, a bracket including an arm adapted for attachment in rigid relation to a bicycle frame and adjacent a wheel of the bicycle, said bracket being formed to provide a guideway trending toward and from the plane of the wheel, a bearing yoke movable in said guideway, the guideway having a slot extending in the direction of movement of the yoke, and said yoke having a transversely extending slot in its wall adjacent the slotted wall of the guideway, said slot of the yoke being open at one end, a flexible shaft and a casing therefor having a terminal adapted to be entered in the slot of the yoke through its open end, and to be entered in the slot of the guideway upon entry of the yoke in the latter, and a gear pinion on said shaft disposed in the yoke for adjustment therewith toward and from the bicycle wheel.

8. In combination, a bracket formed of sheet metal including an arm having an aperture to fit the axle of a bicycle wheel adjacent the wheel-supporting fork for securement by the axle nut, said bracket including a bifurcated portion extending in a plane transverse to that of the arm and forming a slot trending toward and from the bicycle wheel, together with integral portions attached to said bifurcated part and extending in a plane parallel thereto with a space between them constituting a second slot parallel to the first, a flexible shaft and a casing therefor having a terminal engaged in the first mentioned slot, a gear pinion on the shaft disposed between the parallel planes of said slotted parts, and means for adjustably securing the shaft casing in said slot.

9. In the combination defined in claim 8, a yoke member formed of sheet metal folded to afford two leaves spaced apart in parallel planes and dimensioned to fit between the parallel slotted portions of the bracket, both leaves of the yoke having slots trending transversely of the slots of the bracket, a flexible shaft and a casing therefor having a terminal engaged in one slot of the bracket and in one slot of the yoke, a gear pinion on said shaft disposed between the leaves of the yoke, said yoke being slidable in the bracket in the direction of the bracket slots, and means extending through the other slot of the bracket and through the other slot of the yoke including a clamping device for holding the yoke and the pinion at adjusted position in the range of said sliding movement.

10. In combination, a bracket including an arm adapted for attachment in rigid relation to a bicycle frame and adjacent the wheel of a bicycle, said bracket being formed to provide a guideway trending toward and from the plane of the wheel, and a second guideway spaced therefrom and extending parallel thereto, a flexible shaft and a casing therefor having a terminal engaged in the first mentioned guideway, a gear pinion on said shaft disposed between the planes of the guideways, said pinion including a shaft section secured rigidly thereto and extending through the second guideway, and a bearing sleeve for said shaft section with means for adjustably securing said sleeve in the guideway.

11. In the combination defined in claim 10, said bearing sleeve being formed as a hollow bolt with its head engaging the bracket surface adjacent the guideway and with a clamping nut on its externally threaded surface adapted to grip the bracket for securing the bolt in the guideway, the end of said bolt projecting beyond the nut and having a flattened portion for holding the bolt against rotation while the nut is adjusted to clamping position.

12. In the combination defined in claim 2, a hollow shaft rigidly secured to said gear pinion and formed with an interior cross-section which is non-circular, the end portion of the flexible shaft being non-circular in cross-section for driving engagement in said hollow shaft, and said hollow shaft being the portion which bears in the hollow stud.

EDWIN H. SCHULZE.